United States Patent
Prather et al.

(10) Patent No.: US 9,129,656 B2
(45) Date of Patent: Sep. 8, 2015

(54) THEME-BASED METHODS AND SYSTEMS FOR SHIFTING BETWEEN USER INTERFACE VIEWS ASSOCIATED WITH A MEDIA SERVICE

(71) Applicant: Verizon and Redbox Digital Entertainment Services, LLC, Basking Ridge, NJ (US)

(72) Inventors: Ann Gordon Prather, Dallas, TX (US); Christina S. Siegfried, Irving, TX (US); Brian F. Roberts, Dallas, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 0 days.

(21) Appl. No.: 14/141,984

(22) Filed: Dec. 27, 2013

(65) Prior Publication Data

US 2015/0020107 A1 Jan. 15, 2015

Related U.S. Application Data

(60) Provisional application No. 61/846,603, filed on Jul. 15, 2013.

(51) Int. Cl.
*H04N 21/482* (2011.01)
*G11B 27/28* (2006.01)
*H04N 9/79* (2006.01)
*G11B 27/02* (2006.01)
*H04N 21/47* (2011.01)
(Continued)

(52) U.S. Cl.
CPC .............. *G11B 27/28* (2013.01); *G06F 3/0482* (2013.01); *G06F 3/0484* (2013.01); *G06F 3/04842* (2013.01); *G06Q 20/18* (2013.01); *G06Q 30/0255* (2013.01); *G11B 27/02* (2013.01); *H04L 65/601* (2013.01); *H04N 7/163* (2013.01); *H04N 9/7921* (2013.01); *H04N 21/2387* (2013.01); *H04N 21/252* (2013.01); *H04N 21/26258* (2013.01); *H04N 21/26283* (2013.01); *H04N 21/458* (2013.01); *H04N 21/47* (2013.01); *H04N 21/47202* (2013.01); *H04N 21/482* (2013.01); *H04N 21/4825* (2013.01); *H04N 21/4826* (2013.01); *H04N 21/4828* (2013.01); *H04N 21/6587* (2013.01); *H04N 21/8456* (2013.01); *H04N 21/8549* (2013.01)

(58) Field of Classification Search
CPC ............ H04N 21/4826; H04N 21/482; H04N 21/47202
See application file for complete search history.

(56) References Cited

U.S. PATENT DOCUMENTS

| 8,402,495 B1* | 3/2013 | Chang et al. ..................... 725/94 |
| 2005/0160453 A1* | 7/2005 | Kim ................................. 725/39 |

(Continued)

*Primary Examiner* — Robert Hance

(57) ABSTRACT

An exemplary method includes a computer-implemented media service system presenting a first user interface view within which a presentation of a media program is provided for experiencing by a user, determining that the media program is included in a first set of curated media programs associated with a first theme, identifying a second theme that is different than the first theme, detecting a theme shift event that occurs in association with the presentation of the media program, and switching, in response to the theme shift event, from presenting the first user interface view to presenting a second user interface view for experiencing by the user, the second user interface view related to a second set of curated media programs associated with the second theme and unassociated with the first theme. Corresponding methods and systems are also disclosed.

17 Claims, 14 Drawing Sheets

(51) Int. Cl.
*G06Q 20/18* (2012.01)
*G06Q 30/02* (2012.01)
*G06F 3/0484* (2013.01)
*H04L 29/06* (2006.01)
*G06F 3/0482* (2013.01)
*H04N 21/472* (2011.01)
*H04N 21/262* (2011.01)
*H04N 21/458* (2011.01)
*H04N 7/16* (2011.01)
*H04N 21/2387* (2011.01)
*H04N 21/6587* (2011.01)
*H04N 21/25* (2011.01)
*H04N 21/845* (2011.01)
*H04N 21/8549* (2011.01)

(56) References Cited

U.S. PATENT DOCUMENTS

| | | | |
|---|---|---|---|
| 2008/0168501 A1* | 7/2008 | Migos et al. | 725/46 |
| 2009/0178081 A1* | 7/2009 | Goldenberg et al. | 725/46 |
| 2010/0050211 A1* | 2/2010 | Seldin et al. | 725/46 |
| 2012/0180090 A1* | 7/2012 | Yoon et al. | 725/45 |
| 2012/0266188 A1* | 10/2012 | Ryu et al. | 725/25 |

* cited by examiner

THEME-BASED METHODS AND SYSTEMS FOR SHIFTING BETWEEN USER INTERFACE VIEWS ASSOCIATED WITH A MEDIA SERVICE

RELATED APPLICATIONS

The present application claims priority under 35 U.S.C. §119(e) to U.S. Provisional Patent Application No. 61/846,603, filed Jul. 15, 2013. The contents of the provisional patent application are hereby incorporated by reference in their entirety.

BACKGROUND INFORMATION

Media-on-demand content offerings have proliferated in recent years as media content providers have expanded and continue to expand the media content choices available to users by way of set-top box devices, televisions, mobile devices, and other types of media content access devices. For example, thousands of media-on-demand (e.g., video-on-demand) content instances are now available for instant streaming by way of REDBOX INSTANT, NETFLIX, and other types of subscription-based media services.

In some instances, a user may utilize a media service to watch an on-demand media program (e.g., a movie) that scares the user, makes the user uncomfortable or anxious, and/or leaves the user with a bad impression. In these cases, the user may wish to calm his or her nerves, clear his or her mind, and/or relax by watching a differently-themed on-demand media program immediately after watching the first media program. As an example, a user may wish to watch a "funny" movie immediately after watching a "scary" movie late at night so that the user does not have nightmares when he or she goes to sleep. Unfortunately, it may be difficult, cumbersome, and/or time consuming for the user to find and access such a movie.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Theme-based methods and systems for shifting between user interface views associated with a media service are described herein. As will be described below, a media service system may present a first user interface view within which a presentation of a media program is provided for experiencing by a user, determine that the media program is included in a first set of curated media programs associated with a first theme, identify a second theme that is different than the first theme, detect a theme shift event that occurs in association with the presentation of the media program, and switch, in response to the theme shift event, from presenting the first user interface view to presenting a second user interface view for experiencing by the user. As will be described below, the second user interface view may be related to a second set of curated media programs associated with the second theme and unassociated with the first theme.

As an example, a user of a media service may provide user input representative of a request to view a first movie that has been tagged as being related to a first theme (e.g., a "scary" theme). In response, the media service system may present the first movie within a user interface associated with (e.g., provided by) the media service for experiencing by the user. At any time during or after the presentation of the first movie, the media service system may identify a second theme (e.g., a "funny" theme) that is different than the first theme (e.g., by identifying a theme that is predefined to be opposite to the first theme) and select a second movie that has been tagged as being related to the second theme. At the conclusion of the presentation of the first movie, the media service system may automatically switch from presenting the first movie to presenting the second movie within the user interface associated with the media service for experiencing by the user. In this manner, the methods and systems described herein may counteract (e.g., calm down) the emotions created in the user by the first movie.

The methods and systems described herein may benefit end users and/or a provider of a media service that provides media-on-demand media content, providers of media programs, advertisers, and/or one or more other entities. For example, one or more of the theme-based features described herein may allow a user to quickly shift from one theme to another while the user is experiencing a media program and/or immediately after the user has finished experiencing a media program.

Figure 1:
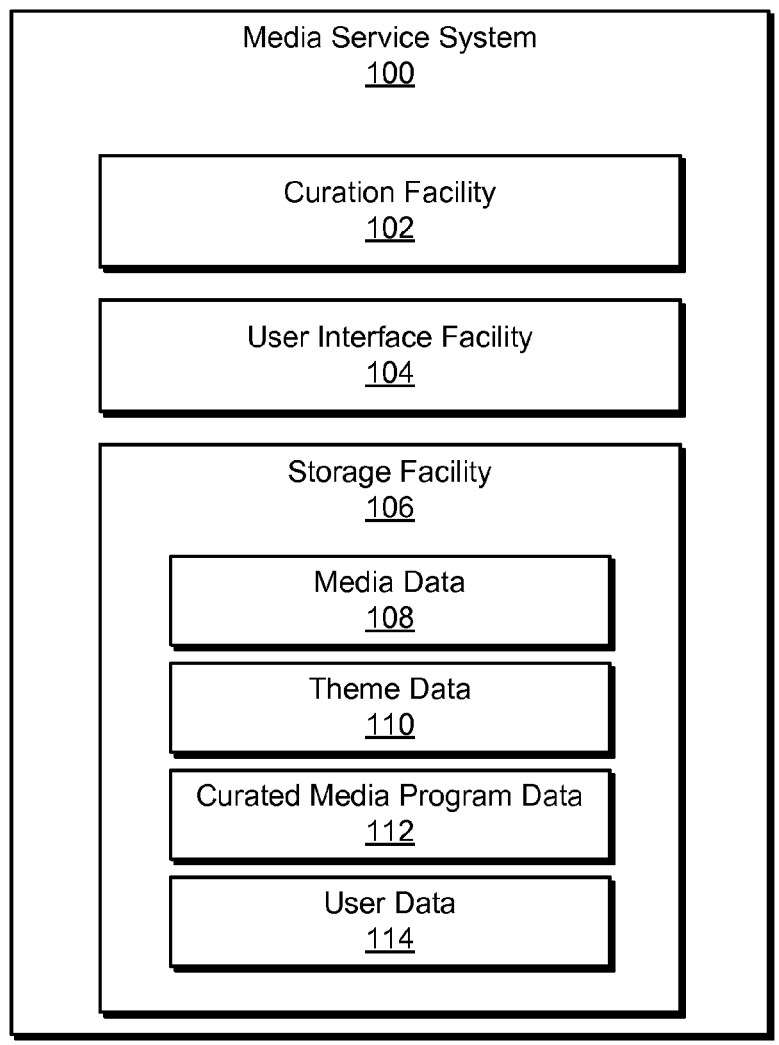
FIG. 1 illustrates an exemplary media service system according to principles described herein.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features and/or tools configured to facilitate user discovery, access, and/or consumption of media content (e.g., media-on-demand content). For example, system 100 may provide a media service through which end users of the service quickly switch between user interface views related to different theme-based sets of curated media programs, such as described herein. System 100 may be associated with (e.g., operated by) a provider of the media service ("service provider").

As shown, system 100 may include, without limitation, a curation facility 102, a user interface facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

Storage facility 106 may be configured to store data generated and/or used by curation facility 102 and/or user interface facility 104. For example, storage facility 106 may store media data 108 representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the media service. Such media programs that are made available for user consumption through a media service may be accessed and/or played back by an appropriately configured media player device for presentation to a user.

Media data 108 may represent actual content of media content and/or information about the media content. For example, media data 108 may include metadata (e.g., information about genre, cast, title, playback duration, release date, chaptering information, etc.) and/or enriched metadata (e.g., user-defined tags, ratings, etc.) for the media content. In certain examples, media data 108 may represent information about media programs included in a repository of on-demand media content.

Storage facility 106 may additionally or alternatively include theme data 110 used and/or generated by curation facility 102 and/or user interface facility 104. For example, theme data 110 may be representative of a predefined relationship between a plurality of different themes that may be related to one or more media programs provided by the media service.

Storage facility 106 may additionally or alternatively include curation data used and/or generated by curation facility 102. For example, curated media program data 112 may identify media programs selected for inclusion in a particular set of curated media programs associated with a particular theme.

Storage facility 106 may additionally or alternatively include user data 114 associated with one or more end users of a media service, such as data representing user profiles of the users. As described herein, such user profiles may be used to automatically select and/or recommend a media program from a particular set of curated media programs for presentation to a user. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by curation facility 102 and/or user interface facility 104. In certain examples, data generated by curation facility 102 and/or user interface facility 104 may be stored permanently or temporarily to storage facility 106.

Curation facility 102 may be configured to perform one or more curation operations with respect to a library of media programs provided by a media service. For example, curation facility 102 may select one or more media programs for inclusion in a particular set of curated media programs associated with a particular theme based on a curation heuristic that specifies a set of curation parameters associated with the particular theme.

Figure 2:
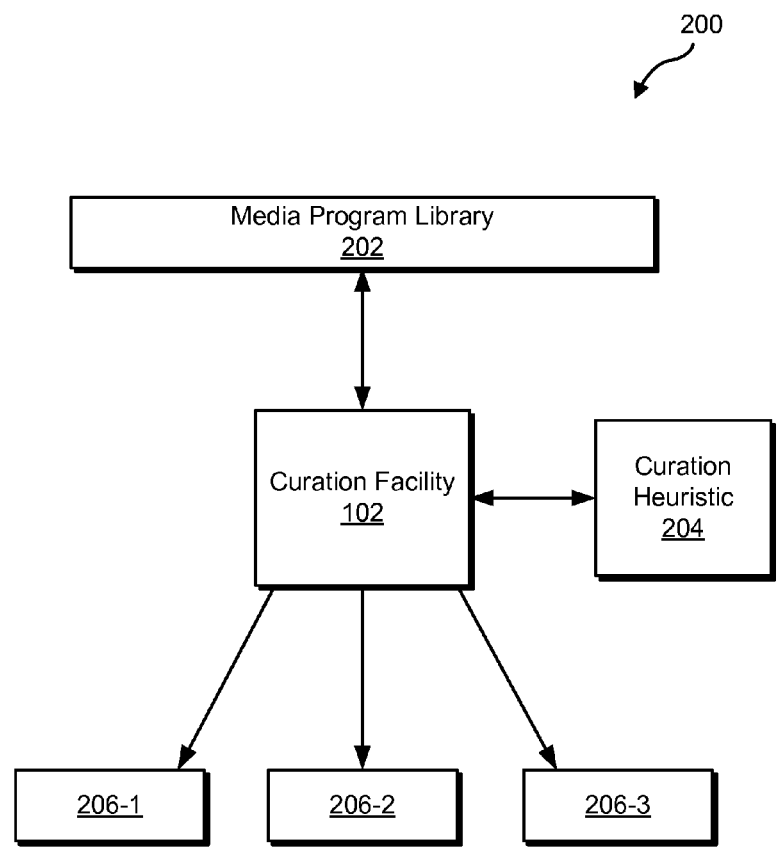
FIG. 2 shows an exemplary curation operation according to principles described herein.

To illustrate, FIG. 2 shows an exemplary curation operation 200 that may be performed by curation facility 102. As shown, curation facility 102 may access a media program library 202, which may include a plurality of media programs available by way of a media service. Curation facility 102 may apply a curation heuristic 204 to media program library 202 in order to generate a plurality of sets 206-1 through 206-3 of curated media programs (collectively "sets 206") each related to a different theme. In some examples, one or more sets 206 may be embodied as on-demand channels accessible by way of the media service.

Figure 3:
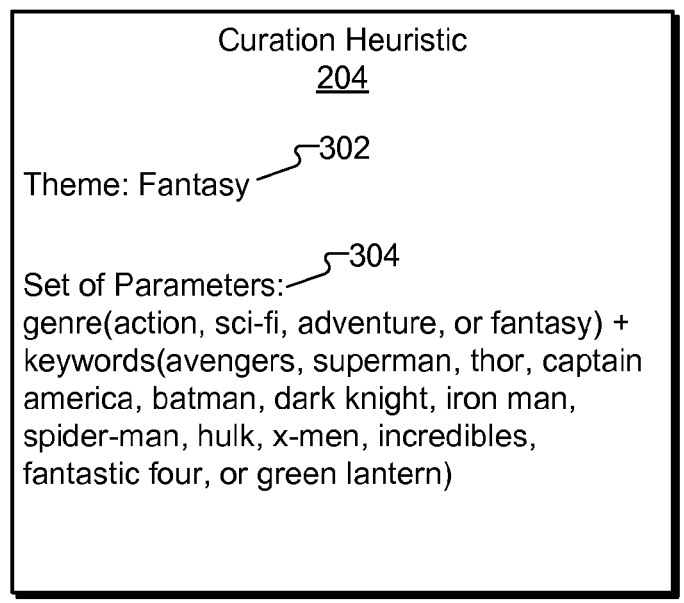
FIG. 3 shows an example of a curation heuristic according to principles described herein.

FIG. 3 shows an example of a curation heuristic 204. As shown, curation heuristic 204 is associated with a theme 302 titled "fantasy" and includes a set of parameters 304 configured to be used by curation facility 102 to identify media programs for inclusion in a set of curated media content related to the "fantasy" theme 302.

A media program theme (or simply "theme") may refer to any themed category of media programs defined by a provider and/or one or more end users of the media service. A theme may be designed to encompass media programs having shared attributes related to the theme. For example, the "fantasy" theme 302 may be designed to encompass media programs that have been designated as being related to fantasy.

The set of parameters 304 may specify any set of criteria and/or logic that may be used by curation facility 102 to identify media programs associated with theme 302. For example, the set of parameters 304 may specify one or more metadata values that may be used by curation facility 102 to search metadata associated with media programs included in a library of media programs to identify, from the library, a set of media programs associated with the theme 302.

Metadata associated with media programs and/or specified by the set of parameters 304 may include any type of metadata. For example, the metadata may include standard metadata included in electronic program guide data and/or received from a service that provides electronic program guide data and/or metadata. Additionally or alternatively, the metadata may include participatory metadata provided by one or more end users of the media service (e.g., user-generated tags, comments, labels, ratings, etc. for media programs) and/or generated by system 100 based on user interactions with the media service (e.g., based on user input provided to discover, access, and/or consume media programs within the media service).

Examples of metadata may include, without limitation, media program genres (e.g., romantic comedy, action, etc.), categories (e.g., animated, television programs, movies, etc.), ratings (e.g., G, PG, PG-13, etc.), release dates, actors, directors, producers, descriptive tags (e.g., user-generated tags), keywords, awards, geographic locations, distribution type (e.g., streaming or physical medium), duration, and/or any other metadata representative of attributes of media programs. The set of parameters 304 may specify values for any combination of such metadata such that the set of parameters 304 specifies a set of conditions to be satisfied by a media program for the media program to be selected to fit within the theme 302. In certain examples, the set of parameters 304 may weight or otherwise prioritize certain metadata values such that the metadata values are given prioritized consideration by curation facility 102. For example, a user provided tag indicating that a particular media program is related to a particular theme may be given a relatively high weight so that the media program is selected for inclusion in a set of curated media programs associated with the theme.

The examples of the theme 302 and corresponding set of parameters 304 described above are illustrative only. Other themes and/or corresponding sets of parameters may be associated with other curation heuristics in other examples.

Returning to FIG. 1, user interface facility 104 may be configured to perform one or more operations to provide one or more user interfaces associated with a media service. For example, user interface facility 104 may be configured to provide a user interface through which users of the media service may access and interface with the media service to discover, access, and consume or experience media programs. The user interface may be in any suitable form. For example, user interface facility 104 may be configured to provide a website, a client application user interface (e.g., a user interface provided by a client application such as a "mobile app" installed and running on a user device), a media player user interface, a graphical user interface ("GUI"), and/or any other form of user interface configured to facilitate interaction with the media service.

User interface facility 104 may present one or more views of a user interface for experiencing by a user. These views may be referred to as "user interface views" and may be presented in any suitable manner. For example, user interface facility 104 may provide data representative of a user interface view to a user device, which may then display (or direct a display device to display) the user interface view. Exemplary user devices include, but are not limited to, a media player computing device (e.g., a media disc player device such as a DVD or BLU-RAY disc player device), a display device, a set-top box device, a digital video recording ("DVR") device, a computer, a mobile device (e.g., a tablet computer or a mobile phone), a gaming console, and/or any other computing device capable of accessing a media service.

User interface facility 104 may be further configured to facilitate theme-based shifting between user interface views associated with a media service. For example, user interface facility 104 may present a first user interface view within which a presentation of a media program is provided for experiencing by a user, determine that the media program is included in a first set of curated media programs associated with a first theme, identify a second theme that is different than the first theme, and detect a theme shift event that occurs in association with the presentation of the media program. In response to the theme shift event, user interface facility 104 may switch from presenting the first user interface view to presenting a second user interface view for experiencing by the user. The second user interface view may be related to a second set of curated media programs associated with the second theme and unassociated with the first theme. Each of these operations will now be described in more detail below.

As mentioned, user interface facility 104 may present a first user interface view within which a presentation of a media program is provided for experiencing by a user. This may be performed in any suitable manner. For example, user interface facility 104 may receive user input representative of a request to view the media program. In response, user interface facility 104 may present the media program within the first user interface view (e.g., by providing the media program for playback within the first user interface view).

User interface facility 104 may determine that the media program is included in a first set of curated media programs associated with a first theme. This may be performed in any suitable manner. For example, user interface facility 104 may determine (e.g., by analyzing metadata associated with the media program) that the media program is tagged as being related to the first theme. As described above, the media program may be manually tagged as being related to the first theme by the user and/or by one or more other users. Additionally or alternatively, the media program may be tagged by a provider of the media service and/or automatically tagged by system 100 in any suitable manner.

In some examples, different portions (e.g., different scenes) of a media program may be tagged as being related to different themes. For example, a first scene included in a movie may be tagged as being related to a "scary" theme and a second scene included in the same movie may be tagged as being related to a "sad" theme. In these examples, user interface facility 104 may determine that a media program is included in a particular set of curated media programs associated with a particular theme by detecting a timestamp within the presentation of the media program at which the theme shift event occurs and identifying a theme related to a scene within the media program that corresponds to the detected timestamp. To illustrate, a theme shift event may occur while a particular media program scene tagged as being related to a "scary" theme is being presented. In response, user interface facility 104 may determine that the media program is included in a set of curated media programs associated with the "scary" theme.

User interface facility 104 may detect a theme shift event that occurs in association with the presentation of the media program. A theme shift event that occurs in association with the presentation of the media program is one that occurs during the presentation of the media program and/or during a predetermined time period following a completion of the presentation of the media program. This will be illustrated in more detail below.

As used herein, a "theme shift event" refers to any event that signals a potential or actual desire of the user to transition from experiencing content related to the first theme to content related to a second theme that is different than the first theme. For example, the theme shift event may be a completion of the presentation of the media program. In this case, user interface facility 104 may detect the theme shift event by detecting a completion of the presentation of the media program. This particular theme shift event will be described in more detail below.

As another example, the theme shift event may include a detection of a time of day during which the media program is presented. To illustrate, a user may be more interested in switching from a first theme to a second theme during night time hours than during day time hours. Hence, user interface facility 104 may be configured to detect a theme shift event by detecting that the media program is presented during a particular time period predefined as being associated with the night.

Alternatively, the theme shift event may be user input provided by the user during the presentation of the media program or during the predetermined time period following a completion of the presentation of the media program. The user input may be representative of a desire of the user to shift from the first theme to a different theme. In this case, user interface facility 104 may detect the theme shift event by detecting the user input.

The user input representative of the desire of the user to shift from the first theme to the different theme may be provided by the user in any suitable manner. For example, the user may provide the user input by selecting an option (e.g., a preprogrammed button) included in a remote control associated with a user device being used by the user to facilitate the presenting of the user interface views. To illustrate, while the user is watching the presentation of the first media program, the user may select a remote control button that has been preprogrammed to provide a command representative of a request to quickly shift to a different theme. User interface facility 104 may detect the command and, in response, switch to presenting a second user interface view associated with the different theme.

As another example, the user may provide the user input representative of a desire to shift from the first theme to the different theme by providing a voice command. User interface facility 104 may detect the voice command and, in response, switch to presenting a second user interface view associated with the different theme. For example, while the user is watching the presentation of the first media program, the user may provide a voice command, such as: "This show is scary! Show me a funny movie instead." User interface 104 may detect this voice command and, in response, switch to presenting a movie associated with a "funny" theme.

In response to the theme shift event (or at any other time while the first user interface view is being presented), user interface facility 104 may identify a second theme that is different than the first theme. This may be performed in any suitable manner. For example, user interface facility 104 may maintain data representative of a relationship between pairs of themes. User interface facility 104 may use this data to identify the second theme.

Figure 4:
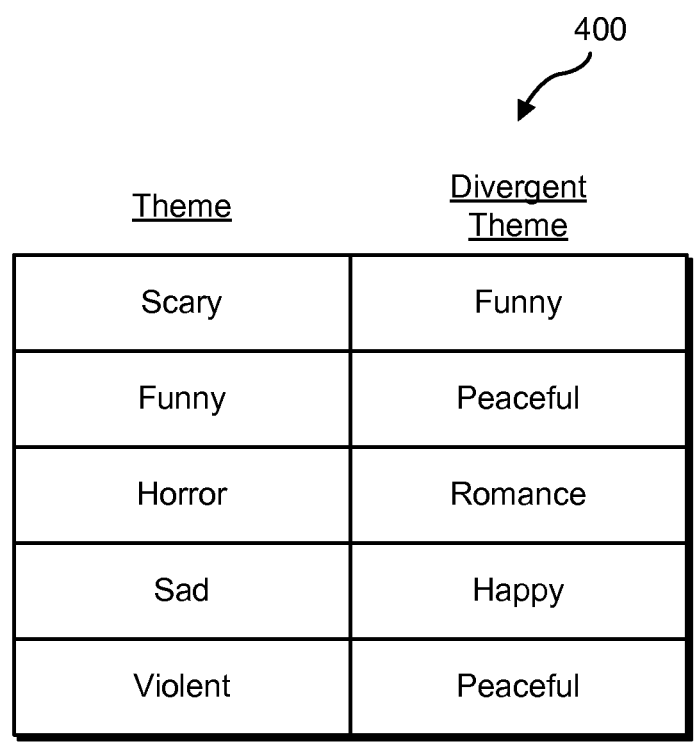
FIG. 4 shows a table that indicates a relationship between various pairs of themes according to principles described herein.

To illustrate, FIG. 4 shows a table 400 that indicates a relationship between various pairs of themes. Table 400 may be maintained by user interface 104 in the form of theme data 110. In the particular example of FIG. 4, table 400 indicates a divergent relationship between the various pairs of themes. In other words, each pair of themes may include themes that have been predefined as being divergent to (e.g., opposite) one another. For example, table 400 indicates that a theme titled "scary" may have a related divergent theme titled "funny", a theme titled "funny" may have a related divergent theme titled "peaceful", a theme titled "horror" may have a related divergent theme titled "romance", a theme titled "sad" may have a related divergent theme titled "happy", and a theme titled "violent" may have a related divergent theme titled "peaceful". The various divergent relationships shown in table 400 may be manually created and/or edited by a user (e.g., an end user or a provider of a media service) and/or automatically created and/or edited by system 100 as may serve a particular implementation.

Returning to the example in which a theme shift event occurs in association with a presentation of a media program related to a first theme, user interface facility 104 may use table 400 to identify a second theme that diverges from the first theme. For example, if the first theme is "scary", user interface facility 104 may use table 400 to determine that the second theme is "funny".

User interface facility 104 may alternatively identify the second theme in any other way. For example, user interface facility 104 may identify the second theme in accordance with one or more preferences set by the user, in accordance with viewing habits of other users (e.g., by identifying what other users watch immediately after watching the media program), in accordance with relationships between media program metadata values, etc.

As mentioned, in response to the theme shift event, user interface facility 104 may switch from presenting the first user interface view to presenting a second user interface view related to a second set of curated media programs associated with the second theme and unassociated with the first theme. In other words, the second set of curated media programs includes media programs that are tagged as being related to the second theme and that are not tagged as also being related to the first theme. In this manner, user interface facility 104 may ensure that the theme associated with the second user interface view diverges from the theme associated with the first user interface view.

The second user interface view may include any type of user interface view related to the second set of curated media programs. For example, the second user interface view may include a presentation of a media program included in the second set of curated media programs. In this case, user interface facility 104 may switch from presenting the first user interface view to presenting the second user interface view by automatically switching from presenting the media program included in the first set of curated media programs (i.e., the "first media program") to presenting the media program included in the second set of curated media programs (i.e., the "second media program") without receiving user input representative of a request to experience the second media program. This will be described in more detail below.

User interface facility 104 may select, from the second set of curated media programs, the second media program that is to be presented to the user within the second user interface view in any suitable manner. For example, user interface facility 104 may select the second media program in accordance with a selection heuristic specific to the user. To illustrate, user interface facility 104 may utilize user data 114 (e.g., a user profile associated with the user) to select a media program from the second set of curated media programs that is likely to be of interest to the user. Additionally or alternatively, the user may specify a particular media program included in the second set of curated media programs that the user always likes to experience immediately after experiencing the media programs associated with the first theme. In this case, user interface facility 104 may be configured to select the media program specified by the user for presentation to the user in response to the theme shift event.

Figure 5:
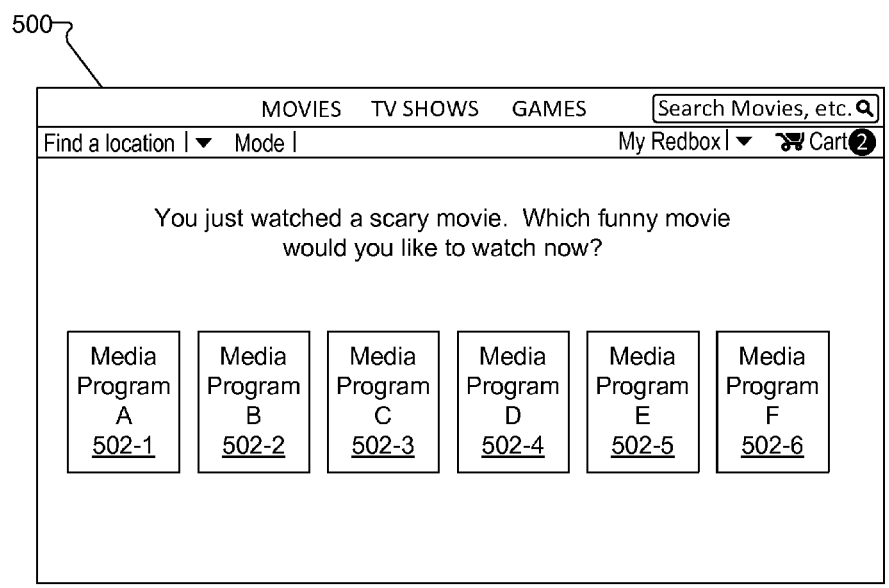
FIG. 5 shows an exemplary browse view that may be presented in response to a theme shift event according to principles described herein.

Alternatively, the second user interface view may include a browse view that includes one or more graphical objects (e.g., cover art images) representative of one or more media programs included in the second set of curated media programs. The user may use the browse view to select a particular media program for experiencing within the user interface. To illustrate, FIG. 5 shows an exemplary browse view 500 that may be presented in response to a theme shift event. As shown, browse view 500 includes graphical objects 502-1 through 502-6 (collectively "graphical objects 502") representative of various media programs included in the second set of curated media programs and labeled "Media Program A" through "Media Program F". The user may select a particular graphical object in order to experience the media program associated with the graphical object. For example, user interface 104 may detect a user selection of graphical object 502-1, and, in response, present a media program titled "Media Program A" within the user interface.

Various examples of the methods and systems described herein will now be provided. These examples are merely illustrative of the many different examples that may be realized in accordance with the methods and systems described herein.

Figure 6:
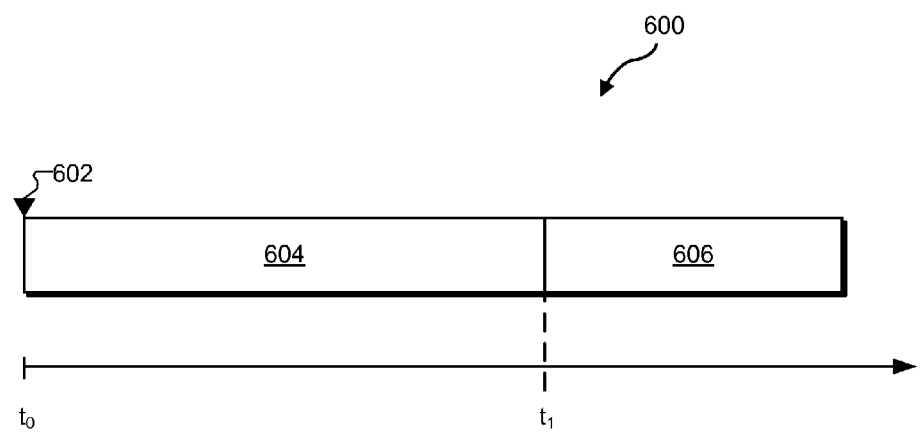
FIGS. 6-8 show various theme events that may occur in association with a presentation of a media program according to principles described herein.

FIG. 6 shows an exemplary scenario 600 in which the theme shift event is a completion of a presentation of a media program. As shown in FIG. 6, at time t0, system 100 detects user input 602 representative of a request to experience (e.g., view) a first media program 604 associated with a first theme. In response, system 100 begins presenting first media program 604. At time $t_1$, system 100 completes the presentation of first media program 604. In some examples, the time of completion corresponds to the time at which the last frame in first media program 604 is presented. Alternatively, the time of completion may correspond to the time at which a predetermined frame included in first media program 604 (e.g., a frame that is temporally positioned right before the closing credits in first media program 604 are to be presented) is presented.

In scenario 600, system 100 may detect the theme shift event by detecting the completion of the presentation of first media program 604. In response, system 100 may select a second media program 606 from a second set of curated media content and begin presenting the second media program 606 in place of first media program 604. In some examples, as described above, system 100 may switch from presenting first media program 604 to presenting second media program 606 without additional user input being provided by the user.

Figure 7:
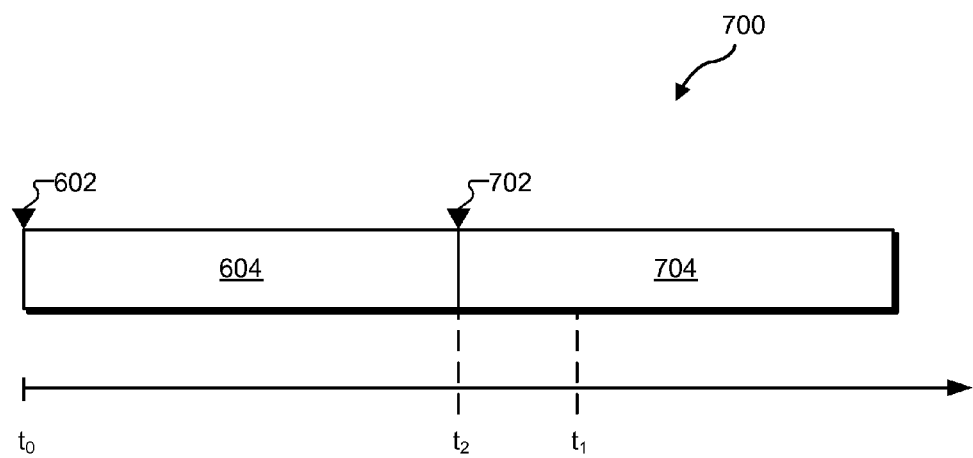

FIG. 7 shows an exemplary scenario 700 in which the theme shift event is user input provided by the user. Scenario 700 is similar to scenario 600 in that at time t0, system 100 detects user input 602 representative of a request to experience first media program 604. In response, system 100 begins presenting first media program 604. As in scenario 600, the presentation of first media program 604 is scheduled to be complete at time $t_1$. However, during the presentation of first media program 604 at time $t_2$, system 100 detects user input 702 representative of a request to switch to a different theme. In response to the user input 702, system 100 switches from presenting first media program 604 to presenting a second user interface view 704 (e.g., a browse view or a presentation of a media program) related to a second set of curated media programs associated with a second theme and unassociated with the first theme.

Figure 8:
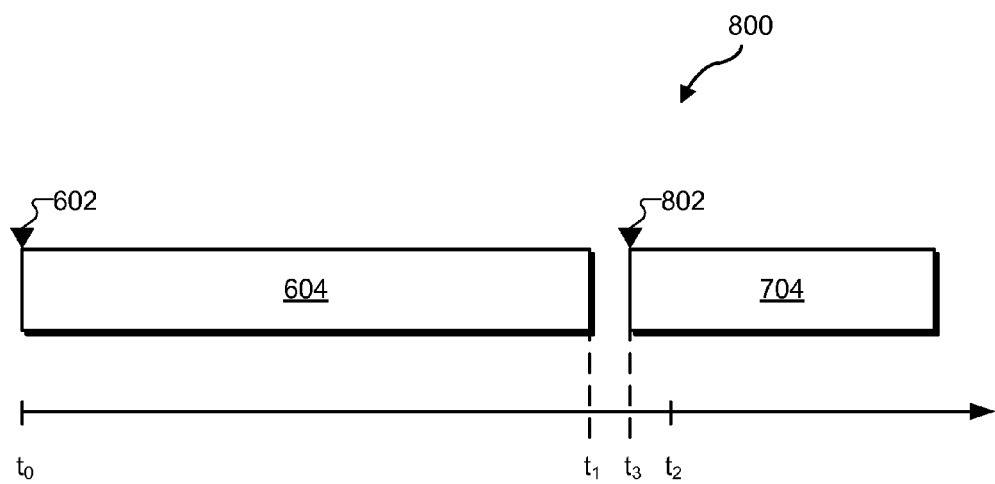

FIG. 8 shows another exemplary scenario 800 in which the theme shift event is user input provided by the user during a predetermined time period following the completion of the presentation of first media program 604. In this scenario 800, the predetermined time period is defined by $t_2-t_1$, where $t_1$ corresponds to the completion of the presentation of first media program 604. As shown in FIG. 8, during the predetermined time period at time $t_3$, system 100 detects user input 802 representative of a request to switch to a different theme. In response to the user input 702, system 100 switches from presenting first media program 604 to presenting the second user interface view 704.

System 100 may be embodied in any suitable implementation as may suit a particular application of principles described herein. To illustrate, examples of such implementations will now be described.

Figure 9:
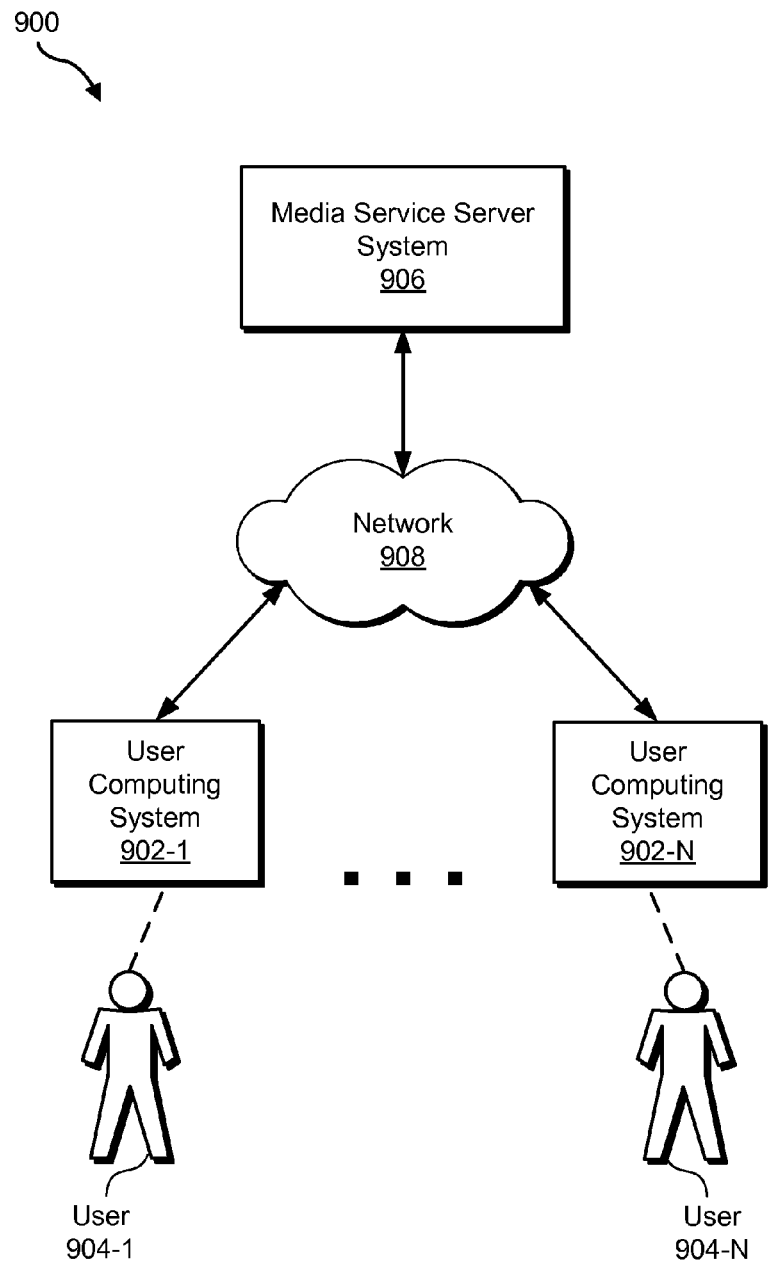
FIG. 9 illustrates an exemplary implementation of the system of FIG. 1 according to principles described herein.

FIG. 9 shows an exemplary implementation 900 of system 100. As shown, implementation 900 may include user computing systems 902 (e.g., user computing systems 902-1 through 902-N) respectively associated with users 904 (e.g., users 904-1 through 904-N), which may be end users of a media service provided by system 100. User computing systems 902 may be in communication with a media service server system 906 ("server system 906"), which may include one or more computing devices (e.g., server devices remotely located from user computing systems 902). In implementation 900, one or more of facilities 102-106 of system 100 may be implemented entirely by a user computing system 902, entirely by server system 906, or distributed across a user computing system 902 and server system 906 in any manner configured to facilitate a user 904 accessing the media service and/or media programs provided by system 100.

User computing systems 902 and server system 906 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 902 and server system 906 may communicate via a network 908. Network 908 may include one or more networks, such as one or more wireless networks (Wi-Fi networks), wireless communication networks, mobile telephone networks (e.g., cellular telephone networks), closed media networks, open media networks, wide area networks (e.g., the Internet), local area networks, and any other networks capable of carrying data (e.g., streaming and/or downloading media programs) and/or communications signals between user computing systems 902 and server system 906. Communications between user computing systems 902 and server system 906 may be transported using any one of the above-listed networks, or any combination or sub-combination of the above-listed networks. Alternatively, user computing systems 902 and server system 906 may communicate in another way such as by direct connections between user computing systems 902 and server system 906.

Server system 906 may be configured to distribute media programs to user computing systems 902 for access and use by user computing systems 902 to present media programs for consumption by users 904. Server system 906 may distribute media programs to user computing systems 902 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 906 may be configured to stream media programs on-demand to user computing systems 902 by way of network 908.

In certain examples, server system 906 may be configured to provide one or more user interfaces for access by user computing systems 902. The user interfaces may be configured for use by users 904 to interact with the media service, including discovering and/or accessing media programs distributed by way of the media service. The user interfaces may include any of the exemplary user interface views described herein.

A user computing system 902 may be configured for use by a user 904 associated with (e.g., operating) the user computing system 902 to access the media service provided by system 100. For example, the user 904 may utilize the user computing system 902 to access one or more user interfaces provided by system 100 as part of the media service, and to present the user interfaces for use by the user 904 to discover, access, and/or consume media programs and/or discrete installments of media programs distributed by server system 906 as part of the media service.

A user computing system 902 may include one or more user computing devices associated with a user 904. Examples of such devices include, without limitation, a media player computing device, a display device, a set-top box, a DVR device, a computer, a tablet computer, a smart phone device, and any other device capable of accessing the media service and/or media programs provided by system 100.

In certain examples, a user computing system 902 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 902 may include any combination of user computing devices or a single user computing device configured to perform any of the user computing system and/or device operations described herein.

Figure 10:
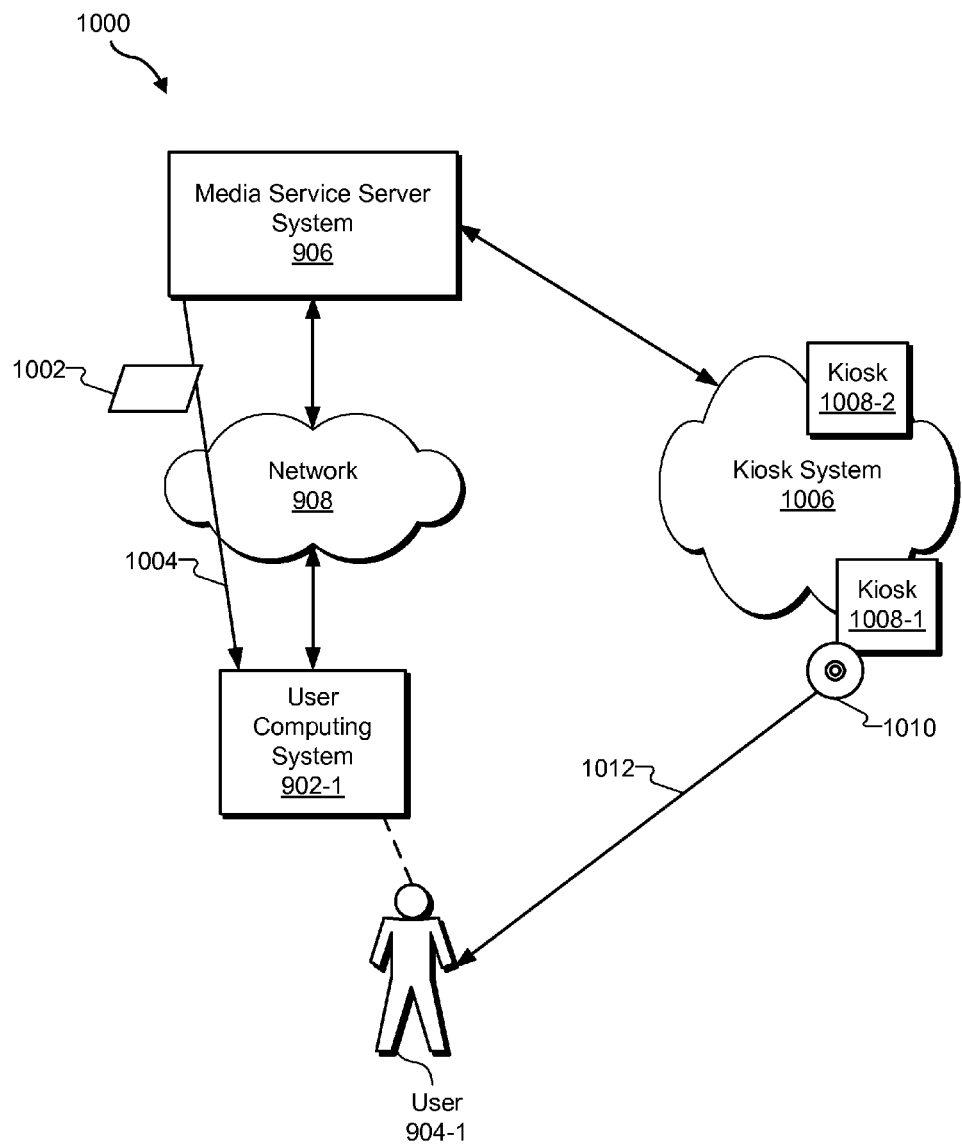
FIG. 10 illustrates another exemplary implementation of the system of FIG. 1 according to principles described herein.

FIG. 10 illustrates another exemplary implementation 1000 of system 100. Implementation 1000 is similar to implementation 900 and additionally utilizes an exemplary media distribution configuration to distribute media programs to end users of a media distribution service. The media distribution configuration may support distribution of media programs, through the media distribution service, by way of multiple different media distribution channels, such as a digital media distribution channel and a physical media distribution channel. As shown, server system 906 may distribute media programs such as digital data 1002 representative of a media program to user computing system 902-1 by way of a digital media distribution channel 1004. This distribution may utilize any suitable media streaming and/or downloading technologies (e.g., Internet media streaming and/or downloading technologies) to support delivery of digital data representative of media programs to user computing system 902 by way of network 908.

As further shown in FIG. 10, server system 906 may be in communication with a media vending kiosk system 1006, which may include one or more geographically distributed vending kiosks 1008 (e.g., vending kiosks 1008-1 and 1008-2) configured to vend physical copies of media programs, such as a physical copy 1010 of a media program, to user 904-1 by way of a physical media distribution channel 1012. For example, user 904-1 may visit a location of media vending kiosk 1008-1 and obtain the physical copy 1010 of the media program from the media vending kiosk 1008-1. In certain examples, one or more of the vending kiosks 1008 may include automated media vending machines.

In certain examples, implementation 1000 may be configured to provide users of the media distribution service with access to media programs by way of a plurality of different media distribution models ("distribution models"). Each distribution model may define a particular way that an end user of the media distribution service may gain access to media programs through the media distribution service. Thus, a user of the media distribution service may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 1004 of FIG. 10, and a physical media distribution model may include or utilize the physical media distribution channel 1012 of FIG. 10.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media distribution service (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 11:
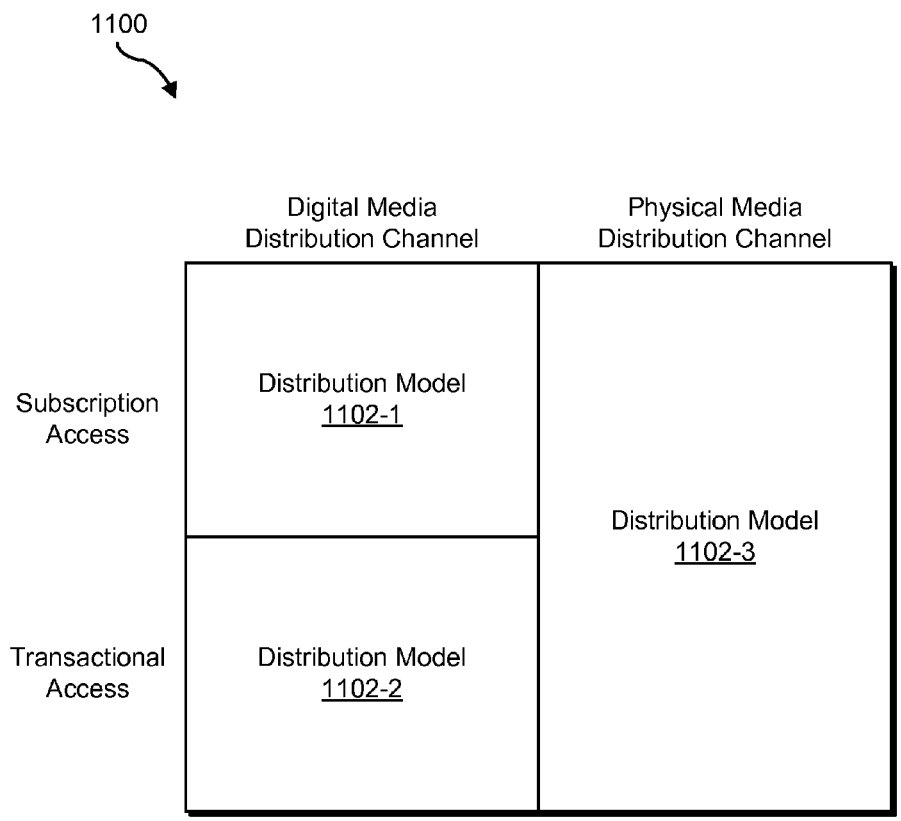
FIG. 11 illustrates a table representing an exemplary set of different media distribution models by way of which access to media programs may be provided by way of a media distribution service according to principles described herein.

Implementation 1000 may be configured to provide users of the media distribution service with access to media programs by way of any of the different distribution models described herein, or by way of any combination or sub-combination thereof. As an example, FIG. 11 illustrates a table 1100 representing a set of different distribution models by way of which access to media programs may be provided through the media distribution service in certain examples. As shown, the set of distribution models includes a first distribution model 1102-1 associated with subscription-based access to media programs by way of a digital media distribution channel, a second distribution model 1102-2 associated with transactional-based access to media programs by way of the digital media distribution channel, and a third distribution model 1102-3 associated with either or both subscription-based or transactional-based access to media programs by way of a physical media distribution channel. In certain examples, these distribution models 1102 may be referred to as a "subscription" digital distribution model 1102-1, an "on-demand" or "rent/buy" digital distribution model 1102-2, and a "physical" or "kiosk" distribution model 1102-3.

Media programs distributed by implementation 1000 as part of the media distribution service may be assigned (e.g., by a provider of the media distribution service) to one or more of the distribution models provided by implementation 1000. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 1102-3 only. At the end of that period of time, the media program may leave distribution model 1102-3, meaning that the media program is no longer accessible by way of distribution model 1102-3. For a second period of time, however, the same media program may be distributed by way of distribution model 1102-2 only. For example, when the media program leaves distribution model 1102-3, the media program may be added to distribution model 1102-2. At the end of the second period of time, the same media program may leave distribution model 1102-2 and be assigned to distribution model 1102-1. This example is illustrative only, a media program may be made accessible by way of different distribution models or specific combinations of distribution models for specific periods of time, and may be added to or removed from any distribution model in any suitable way.

Implementation 1000 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

Figure 12:
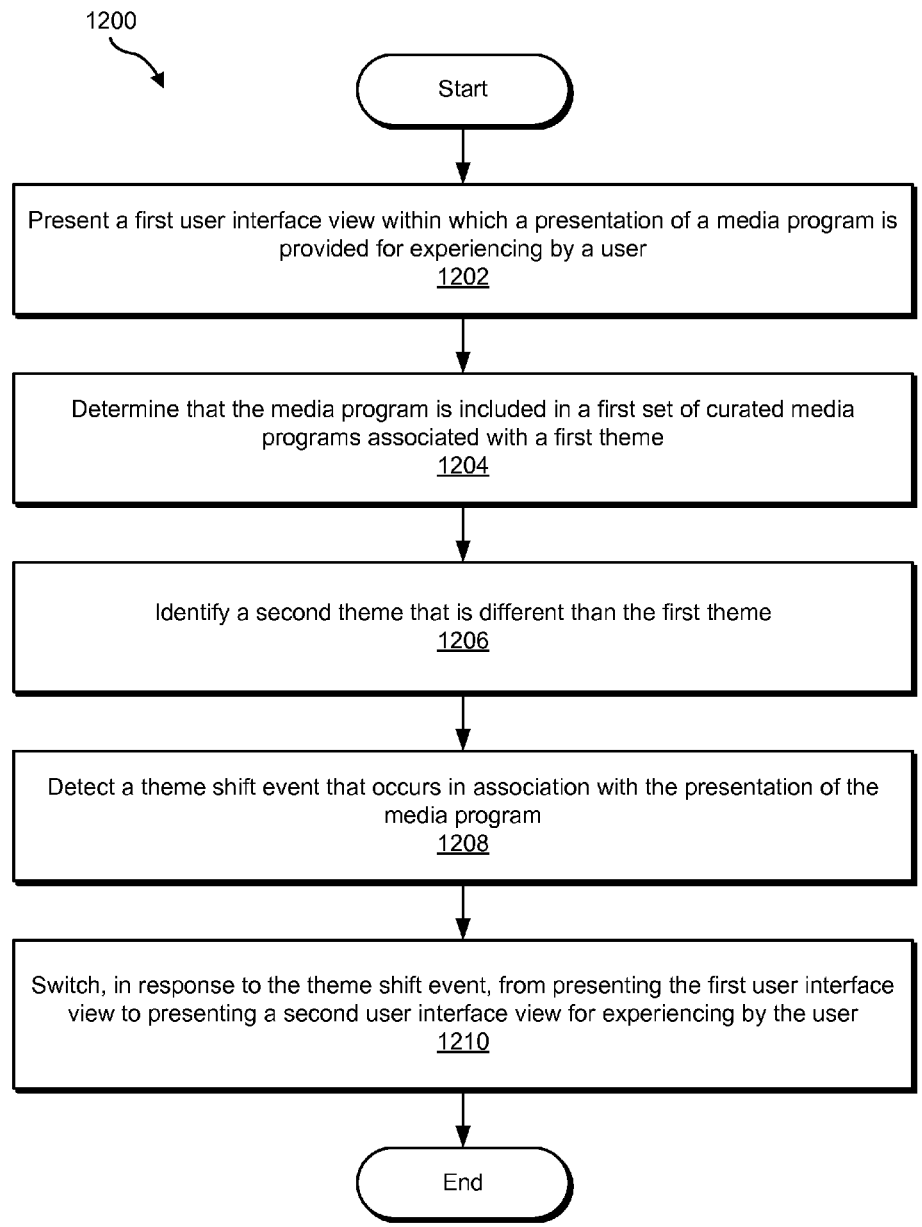
FIGS. 12-13 illustrate exemplary theme-based methods for shifting between user interface views associated with a media service according to principles described herein.
Figure 13:
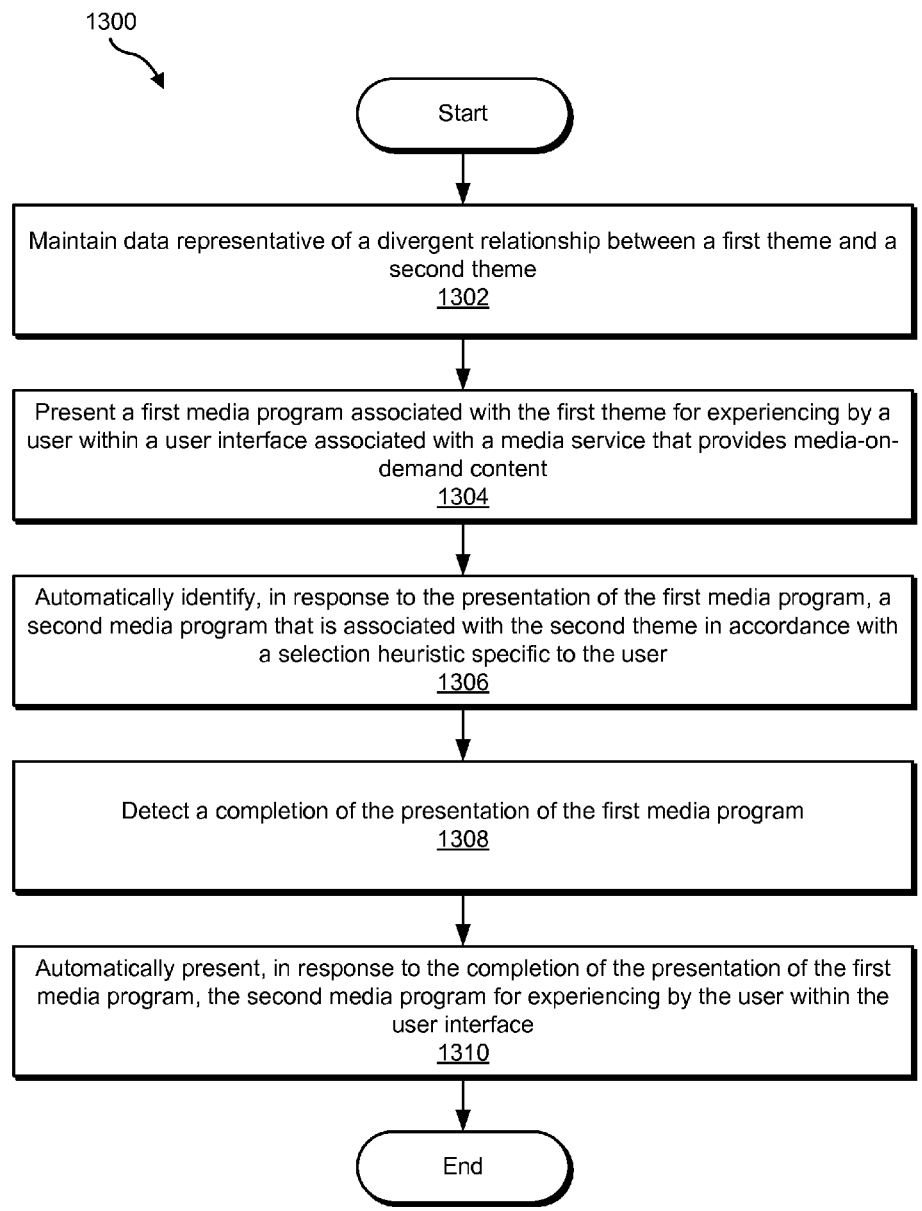

FIGS. 12-13 illustrate exemplary theme-based methods 1200 and 1300 for shifting between user interface views associated with a media service. While FIGS. 12-13 illustrate exemplary steps according to certain embodiments, other embodiments may omit, add to, reorder, combine, and/or modify any of the steps shown in FIGS. 12-13. In certain embodiments, one or more of the steps shown in FIGS. 12-13 may be performed by system 100 and/or one or more components or implementations of system 100.

Turning to the method 1200 illustrated in FIG. 12, in step 1202, a system (e.g., system 100) presents a first user interface view within which a presentation of a media program is provided for experiencing by a user. Step 1202 may be performed in any of the ways described herein.

In step 1204, the system determines that the media program is included in a first set of curated media programs associated with a first theme. Step 1204 may be performed in any of the ways described herein.

In step 1206, the system identifies a second theme that is different than the first theme. Step 1206 may be performed in any of the ways described herein.

In step 1208, the system detects a theme shift event that occurs in association with the presentation of the media program. Step 1208 may be performed in any of the ways described herein.

In step 1210, the system switches, in response to the theme shift event, from presenting the first user interface view to presenting a second user interface view for experiencing by the user. As described above, the second user interface view may be related to a second set of curated media programs associated with the second theme and unassociated with the first theme. Step 1210 may be performed in any of the ways described herein.

Turning to the method 1300 illustrated in FIG. 13, in step 1302, a system (e.g., system 100) maintains data representative of a divergent relationship between a first theme and a second theme. Step 1302 may be performed in any of the ways described herein.

In step 1304, the system presents a first media program associated with the first theme for experiencing by a user within a user interface associated with a media service that provides media-on-demand content. Step 1304 may be performed in any of the ways described herein.

In step 1306, the system automatically identifies, in response to the presentation of the first media program, a second media program that is associated with the second theme in accordance with a selection heuristic specific to the user. Step 1306 may be performed in any of the ways described herein.

In step 1308, the system detects a completion of the presentation of the first media program. Step 1308 may be performed in any of the ways described herein.

In step 1310, the system automatically presents, in response to the completion of the presentation of the first media program, the second media program for experiencing by the user within the user interface. Step 1310 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 14:
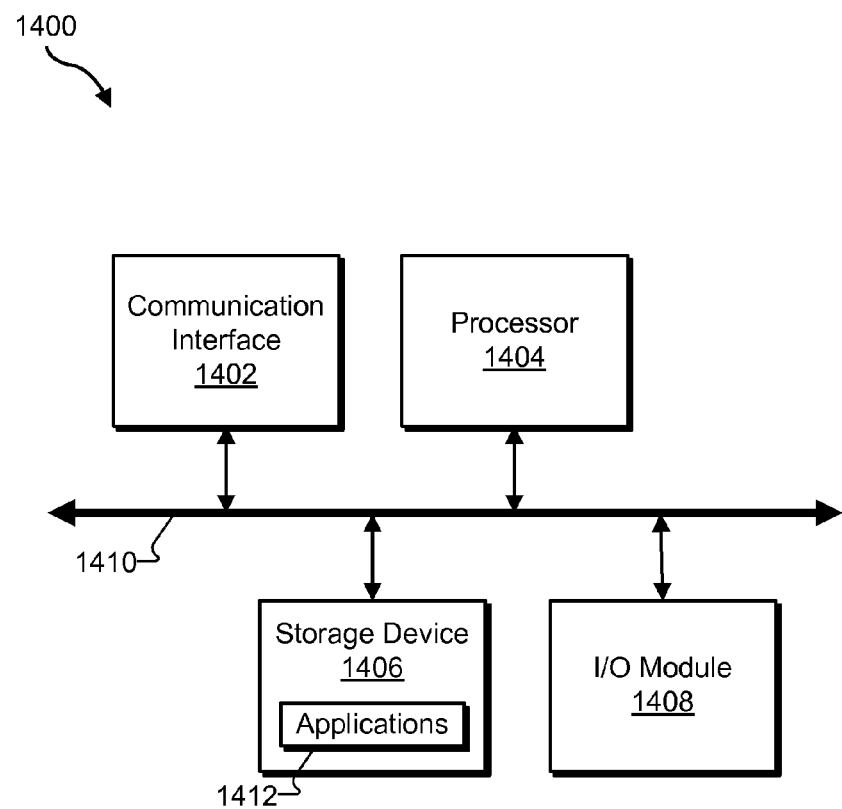
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional, fewer, or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1406. For example, data representative of one or more applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with curation facility 102 and/or user interface facility 104. Likewise, storage facility 106 may be implemented by or within storage device 1406. Such an implementation may be referred to as a computer-implemented system, such as a computer-implemented media service system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

To the extent the aforementioned embodiments may modify media programs and/or provide alternative ways for users to access and/or consume media programs, it should be understood that such operations shall be used in accordance with all applicable laws and/or agreements concerning protection of media programs and the rights of owners and/or distributors of media programs. One or more of the operations described herein may be subject to the consent and/or agreement of one or more entities, such as owners and/or distributors of media programs.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   presenting, by a computer-implemented media service system, a first user interface view within which a presentation of a media program is provided for experiencing by a user;

determining, by the computer-implemented media service system, that the media program is included in a first set of curated media programs associated with a first theme;

identifying, by the computer-implemented media service system, a second theme that is different than the first theme;

detecting, by the computer-implemented media service system, a theme shift event that occurs in association with the presentation of the media program and a timestamp within the presentation of the media program at which the theme shift event occurs; and switching, by the computer-implemented media service system in response to the theme shift event, from presenting the first user interface view to presenting a second user interface view for experiencing by the user, the second user interface view related to a second set of curated media programs associated with the second theme and unassociated with the first theme;

wherein the determining comprises determining that a scene within the media program and associated with the timestamp is tagged as being related to the first theme.

2. The method of claim 1, wherein the detecting of the theme shift event that occurs in association with the presentation of the media program comprises detecting a completion of the presentation of the media program.

3. The method of claim 1, wherein the detecting of the theme shift event that occurs in association with the presentation of the media program comprises detecting a time of day during which the presentation of the media program is performed.

4. The method of claim 1, wherein the detecting of the theme shift event that occurs in association with the presentation of the media program comprises detecting user input provided by the user during the presentation of the media program and representative of a desire of the user to shift from the first theme to the second theme.

5. The method of claim 4, wherein the detecting of the user input comprises detecting a selection by the user of an option included in a remote control associated with a user device being used by the user to facilitate the presenting of the first user interface view.

6. The method of claim 4, wherein the detecting of the user input comprises detecting a voice command provided by the user.

7. The method of claim 1, wherein the detecting of the theme shift event that occurs in association with the presentation of the media program comprises detecting the theme shift event during the presentation of the media program or during a predetermined time period following a completion of the presentation of the media program.

8. The method of claim 1, wherein the second theme is predefined as being opposite to the first theme.

9. The method of claim 1, wherein the second user interface view comprises a presentation of an additional media program included in the second set of curated media programs.

10. The method of claim 9, wherein the switching from presenting the first user interface view to presenting the second user interface view comprises automatically switching from presenting the media program to presenting the additional media program without receiving user input representative of a request to experience the additional media program.

11. The method of claim 9, further comprising selecting, by the computer-implemented media service system, the additional media program from the second set of curated media programs for presentation to the user in accordance with a selection heuristic specific to the user.

12. The method of claim 1, wherein the second user interface view comprises a browse view that includes one or more graphical objects representative of one or more media programs included in the second set of curated media programs.

13. The method of claim 12, further comprising:

detecting, by the computer-implemented media service system, a user selection of a graphical object included in the one or more graphical objects; and presenting, by the computer-implemented media service system in response to the user selection of the graphical object, a media program represented by the graphical object.

14. The method of claim 1, further comprising selecting, by the computer-implemented media service system, one or more media programs for inclusion in the second set of curated media programs based on a curation heuristic that specifies a set of curation parameters associated with the second theme.

15. The method of claim 1, embodied as computer-executable instructions on at least one non-transitory computer-readable medium.

16. The method of claim 1, further comprising:

maintaining, by the computer-implemented media service system, data representative of a table that indicates divergent relationships between pairs of themes;

wherein the identifying comprises using the table that indicates divergent relationships between pairs of themes to identify the second theme.

17. A system comprising:

at least one physical computing device that:

presents a first user interface view within which a presentation of a media program is provided for experiencing by a user, determines that the media program is included in a first set of curated media programs associated with a first theme, identifies a second theme that is different than the first theme, detects a theme shift event that occurs in association with the presentation of the media program and a timestamp within the presentation of the media program at which the theme shift event occurs, and switches, in response to the theme shift event, from presenting the first user interface view to presenting a second user interface view for experiencing by the user, the second user interface view related to a second set of curated media programs associated with the second theme and unassociated with the first theme, wherein the at least one physical computing device determines that the media program is included in the first set of curated media programs associated with the first theme by determining that a scene within the media program and associated with the timestamp is tagged as being related to the first theme.

* * * * *